United States Patent [19]

Günter

[11] Patent Number: 4,580,316
[45] Date of Patent: Apr. 8, 1986

[54] HOSE MATERIAL TO BE USED AS SAUSAGE CASING, IN PARTICULAR IN THE AUTOMATED MANUFACTURE OF SAUSAGE STRINGS ON A SAUSAGE STUFFING MACHINE

[75] Inventor: Kollross Günter, Gross-Gerau Dornheim, Fed. Rep. of Germany

[73] Assignee: Teepak Produktie, N.V., Lommel, Belgium

[21] Appl. No.: 640,908

[22] Filed: Aug. 15, 1984

Related U.S. Application Data

[63] Continuation-in-part of Ser. No. 584,252, Feb. 2, 1984.

[51] Int. Cl.⁴ ............................................. A22B 11/02
[52] U.S. Cl. ......................................... 17/33; 17/49; 53/506
[58] Field of Search ................. 17/33, 49, 1 R; 83/63, 83/71; 53/55, 506, 576, 122

[56] References Cited

U.S. PATENT DOCUMENTS 3,527,128  9/1970  Thumim ................................. 83/71
3,618,788  11/1971  Murray ............................... 83/71 X Primary Examiner—Willie G. Abercrombie
Attorney, Agent, or Firm—Michael L. Dunn; William J. Crossetta

[57] ABSTRACT

Hose material for the continuous automated manufacture of sausage wherein tubular material for sausage casing from a supply source is axially shirred by shirring means into shirred sections, of continuously measured length; the shirred sections are stuffed with force meat into divided up and closed off portions with the amount of tubular material utilized being continually measured; and, the entire process is controlled by memory, comparator and means responsive thereto, all of which are activated by register marks spaced at equal lengths along the length of the hose material, to maximize utilization of shirred casing and to avoid stuffing into a void.

13 Claims, 11 Drawing Figures

HOSE MATERIAL TO BE USED AS SAUSAGE CASING, IN PARTICULAR IN THE AUTOMATED MANUFACTURE OF SAUSAGE STRINGS ON A SAUSAGE STUFFING MACHINE

This application is a continuation-in-part of U.S. application Ser. No. 584,252, filed Feb. 2, 1984, now pending.

This invention relates to hose material is to be used as sausage casing, in particular in the automated manufacture of string sausages on a sausage stuffing machine, wherein individual lengths of hose material are drawn from a supply source near the stuffing machine, shirred (gathered up longitudinally) and separated from the source, each such shirred and separated section of the casing then being brought into contact with the stuffing machine, whereupon force-meat is proportioned through a filling tube into the shirred casing as it slides off the tubs under frictional control and is clipped off and sealed.

Such a manufacturing method was described in DE-OS No. 29 41 872. It offers the sausage manufacturer a number of considerable advantages over the conventional method using what are known as "tubular corrugations", delivered ready-shirred from the hose manufacturer:

long lengths of hose material coiled on supply rolls take up much less storage space on the sausage manufacturer's premises than do the ready-shirred tubular corrugations;

since the hose material is wetted only just before it is shipped to the sausage manufacturer, sterility is much easier to maintain and the material can be stored over fairly long periods of time in dry conditions without the risk of bacterial contamination;

the moisture content the hose material must have to be shirred and stuffed can be much more quickly imparted by wetting un-shirred material than by wetting tightly shirred tubular corrugations, so wetting can be done during line production;

there is no longer any need to remove the sheaths or nettings in which individual tubular corrugations are packed (generally only manual removal is feasible);

since the hose lengths become shirred only just before being brought into position for stuffing with force-meat on the stuffing machine, this positioning step can be automated, thus reducing the labor needed and eliminating the possibility of the hose material's becoming damaged when being positioned manually on the filling tubes;

since the shirring operation can also be automated, the entire shirring/stuffing/clipping-off process can be automated and rationalized.

However, if only these improvements were implemented, the said method of manufacture would still require the presence of an operator. Since tolerances are unavoidable in the dimensions and elasticity of the hose material and in the length of shirred sections of material, the gradual withdrawing of stuffed sections from the filling tube must be monitored continuously, and the stuffing machine turned off manually whenever necessary to prevent "stuffing the air" whenever a section is shorter than expected, since otherwise a wasteful "safety length" of empty casing would have to be left at the end of each section.

U.S. Pat. No. 3,223,725, which has the same priority, describes an improvement to the known process, wherein the improvement comprises continually measuring both the length of each shirred hose section as it is drawn from the supply source, as well as the length of hose material drawn off the filling tube during stuffing on the stuffing machine, and comparing this latter measurement of hose material length with the section length measured previously at the shirring step, and then on the basis of this comparison to interrupt stuffing, clipping-off and sealing as necessary. In other words the length measured at the shirring step is always used as a reference quantity in subsequent processing, on the stuffing machine, of the previously measured hose sections, so that the hose material is utilized to the fullest extent and waste is minimized.

These lengths can be measured by conventional techniques in which the material passes beneath friction-driven metering rolls. However, in actual practice with such techniques there is always a residual degree of slippage which distorts the measurements, in particular when the hose material is lubricated, and furthermore length measurements of hose sections drawn off the filling tube will be distorted unless the measurements are made upstream of the braking element, since after this point the material is subject to internal pressure an force-meat is stuffed into the casing.

For these reasons, a specific embodiment of the process specified at the beginning of this application is claimed in the patent with the same priority, as an alternative to the conventional technique of measuring length, wherein the specific embodiment comprises a technique of length measurement in which register marks uniformly spaced along the hose material are counted by automatic means as hose sections are drawn from the supply roll and as they are drawn off the filling tube.

In contrast, the object of the present invention is to provide a hose material for use as a sausage casing, especially in conjunction with a process as specified at the beginning of this application, wherein the use of said hose material ensures that length is accurately measured without distortion due to slippage or to stretching of the material, in particular such stretching as occurs when the material is subject to internal pressure as force-meat is stuffed into it.

In a simple embodiment, such material register marks can be dots or strokes imprinted longitudinally along the hose material, the marks being detected by photocells whose output signals are counted by a counting device. The hose material "scale", which comprises a series of division marks with no zero reference or reading indications since the invention relates only to the counting of scale marks, could also be realized with material register marks detectable by mechanical means, for example small raised dots or strokes.

In another embodiment, the register marks can be realized by means of a material containing a metallic component and which is applied to the hose material, or embedded in it in the form of inclusions, so that the marks can be detected by magnetic or electrical sensors.

In principle, a scaled division of the kind described can be realized in or on the hose material with any type of register mark, provided the sensors in each case are of the appropriate type and the register marks are counted as they move past the sensors.

Clearly one such way to scale the hose material is by means of an unbroken register line, for example inked on the hose material, that winds helically along the hose, the reason being that the piston of the helical register line will serve as a unit distance in measuring length. The pitch can be chosen as 1 cm, for example, or several centimeters, and for practical reasons should be no longer than the length of the smallest sausage intended to be manufactured with the hose material.

It is, in principle, irrelevant at what point in time the length-scaling register mark or marks in accordance with the present invention, are realized in or on the hose material. If there is reason to suspect that register marks realized on the outside of the hose material could be damaged and so measurements based on them become unreliable, register marks can be imprinted, or realized in some other way, on the inside of the hose, alternatively if the hoses are manufactured as welded sheets of material the register marks could be realized in the longitudinal seam between the overlapping edges of the original sheet material.

Since the length measurement arrangement used in conjunction with a scaled division of the hose material is based on the counting of register marks, whether or not the hose material is stretched at the measure point is of no significance. In particular, the measurement arrangement for hose material being drawn off the filling tube during stuffing will deliver accurate lengths even when the corresponding sensor is located downstream of the casing brake (the direction in which the casing moves).

There follows a detailed description of the present invention, to be read together with the accompanying drawings wherein.

Figure 1:
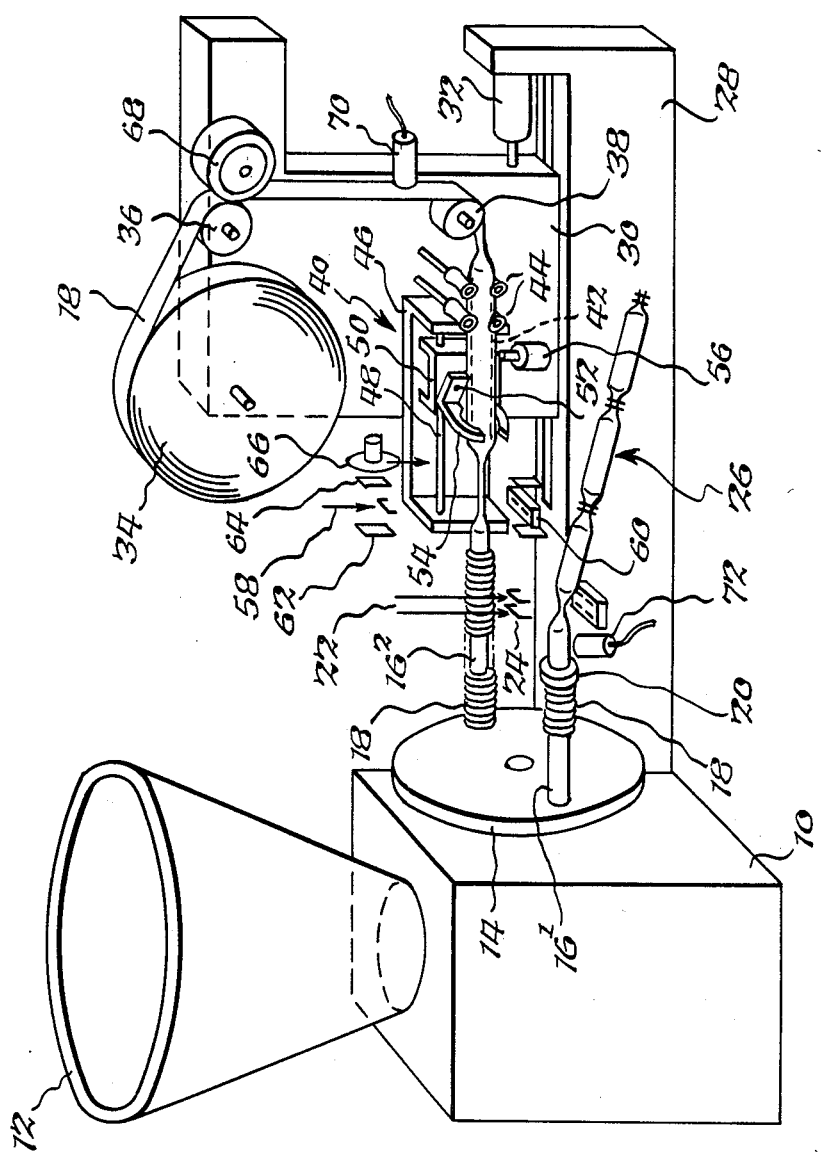
FIG. 1 illustrates an arrangement for realizing the method specified at the beginning of this application, with the use of hose material in accordance with the present invention.

FIG. 1 shows a sausage stuffing machine 10. In accordance with the prior art, processed meat is introduced from above through hopper 12 into the stuffing machine, where it is ground to the desired consistency. On one side of the machine 10 is a revolving disk 14 in which two identically constructed filling tubes $16^1$, $16^2$ are mounted diametrically opposed to each other, so that each filling tube in turn can be positioned in front of the force-meat ejector (not shown) of the filling machine 10 when the disk is rotated through 180 degrees by means of a drive mechanism (not shown). In the foreground of the drawing, filling tube $16^1$ is in stuffing position in front of the force-meat ejector, while at the rear of the drawing filling tube $16^2$ is shown in the loading position.

The manner in which filling tube $16^2$ is "loaded" with sausage casing in the form of shirred synthetic hose is described in the following paragraph. The casing on filling tube $16^1$, which is in stuffing position, becomes stuffed with force-meat as it is drawn off under frictional control. A casing brake 20 at the end of filling tube $16^2$ elastically surrounds tube and casing, and brakes the casing uniformly around its circumference so that it becomes evenly stuffed as it slides off the filling tube.

Reference numeral 22 specifies a clip-setting arrangement (shown very schematically) located at the open end of filling tube $16^1$, that drives pairs of clips against a backplate to clip off the stuffed hose material 26 and so to create a string of sausages sealed off from each other. When the hose material on front filling tube $16^1$ is used up, casing brake 20 is moved away from the filling tube so that the tube can be rotated onwards through another 180 degrees as the second filling tube $16^2$, which has by now been "reloaded", moves into stuffing position in front of the force-meat ejector of the machine. The casing brake 20 is repositioned over the end of the filling tube and stuffing as described above begins again, continuing until the hose material on the tube is used up, and in the meanwhile the filling tube in loading position is reloaded with hose material.

The filling tube currently in loading position is loaded by means of the following arrangement:

A removable supply roll 34 holding a coil of flat synthetic-casing hose mateiral 18 is mounted on a carriage 30 which travels parallel to the filling tubes 16 on a bed 28 centiguous with the stuffing machine 10. The carriage can be moved between a forward position (at the left in the drawing) and a retracted position (at the right in the drawing) by means of a hydraulic or pneumatic double-acting cylinder 32. The hose material 18 rides over idler rollers 36, 38 as it is pulled into a shirring arrangement, to be referred to in its entirety as 40, along the centerline of whichever filling tube 16 is in loading position. The shirring arrangement works together with a shirring tube 42 having the same diameter as filling tubes $16^1$, $16^2$. The shirring tube 42 is float-mounted between two pairs of guide pulleys 44 and moves along the centerline of filling tube $16^2$, which is in loading position. The hose material 18 pulled off supply roll 34 runs flat over idler rollers 36, 38 and then over the end of shirring tube 42, so that the hose material is opened up into cylindrical form. Since guide pulleys 44 are free-running, the hose material can slide without hindrance between the pulleys and shirring tube 42.

The shirring arrangement 40 comprises a U-shaped support frame 46 which is attached to carriage 30 and has two parallel guide rods 48 attached at their ends to the frame sides. A U-shaped slide 50 travels on guide rods 48 in a direction parallel to shirring tube 42. There are two shafts 52 mounted one above the another in slide 50. A gripper lever with a semicircular gripper jaw 54 is attached to each shaft 52 at the front of the slide. The two gripper jaws 54 work together like the jaws of a pliers, in that they can be opened and closed when the shafts are rotated in opposite directions. Slide 50 has a drive unit (not shown) which moves the slide back and forth along guide rods 48. At the rear of slide 50 is a drive unit (also not shown) for the gripper jaw shafts, the movement which the drive unit imparts through them to the gripper jaws being a function of slide motion in which a manner that the gripper jaws close when slide 50 is in its rightmost limit position, remain closed as the slide is moved to the left, open when the slide reaches its leftmost limit position and remain open while the slide is moving back to its rightmost position, at which point they close again.

On the inner surace of gripper jaws 54 are friction facings which accommodate the external diameter of shirring tube 42, so that when gripper jaws 54 are closed they frictionally engage the hose material 18 around shirring tube 42, whereas when the jaws are open they can be moved without hindrance over the hose material.

There is also a clamping device 56 mounted on the carriage 30 that is used to clamp hose material 18 against shirring tube 42, in order to hold hose material 18 and shirring tube 42 in a fixed position relative to carriage 30. The clamping device 56 can be a pneumatic or hydraulic cylinder, or a solenoid with a friction facing mounted on the end of its plunger to frictionally engage the hose material when the solenoid is operated. The travel of carriage 30 on bed 28 is such that, in the forward position, shirring tube 42 rests flush against whichever filling tube 16 is in loading position, while in the retracted position shirring tube 42 is at a convenient distance, for instance 100 to 150 mm, from filling tube 16. Located in this region, above and below the path of shirring tube 42, is a clip-setting arrangement comprising a driver 58 (indicated only schematically by an arrow), a backplate 60, two pairs of pinching jaws 62 and 64, and a cut-off mechanism comprising, for example, a disk blade 66 and drive unit in such a manner that the disk blade when not in operation is retracted from the path of shirring tube 42 far enough so that when shirring tube 42 is clamped against carriage 30 the carriage can move without hindrance against filling tube 16, and also far enough that the gripper jaws 54 can be moved back and forth along shirring tube 42 and filling tube 16.

There is a spring-loaded adjustable-force pressure roller 68 mounted on carriage 30 and facing the idler roller 36. There is also a sensor 70, for instance a photocell, mounted on carriage 30 between idler rollers 36 and 38, such that as hose material 18 moves past the sensor it detects register marks created in or on the hose material in a manner to be described below.

There is another sensor 72 located near filling tube 16$^1$ in stuffing position and farther out from the filling machine than casing brake 20, the purpose of this sensor being to detect the abovementioned register marks in hose material being drawn off filling tube 16$^1$, so that the length of hose material drawn off can be determined on the basis of register mark count. Different embodiments are possible of the register marks created in or on the hose material at equal intervals along its length in accordance with the present invention, as well as of sensors 70, 72 used to detect the marks.

Figure 2A:
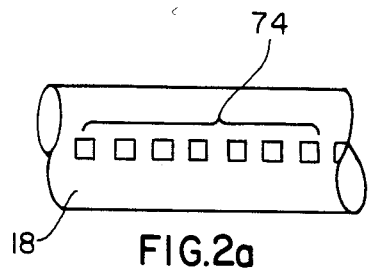
FIGS. 2a,2b are schematic views, from one side and the front respectively, of an initial embodiment of the hose material, showing square dots imprinted as register marks on the material, the marks beng detected by an optical sensor such as a photocell.
Figure 2B:
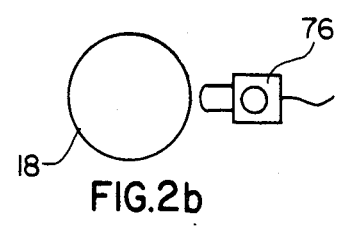

FIGS. 2a and 2b show an initial, particularly simple embodiment in the form of rectangular dots 74 imprinted at equal intervals along the length of hose material 18, so that the dots can be detected by a sensor in the form of a photocell 76 which transmits to an electronic counting system (not shown) one signal for each dot detected.

Figure 3A:
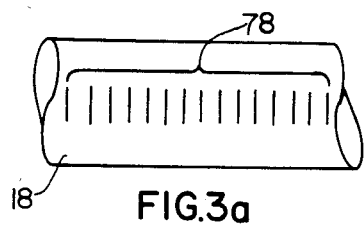
FIGS. 3a,3b are two views as in FIG. 2, showing strokes imprinted on the hose material as register marks, these marks again being detected by optical means.
Figure 3B:
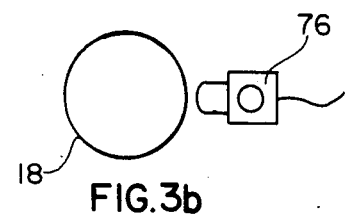

The embodiment shown in FIGS. 3a and 3b differs from that shown in FIGS. 2a and 2b only in that register strokes 78 are imprinted instead of register dots 74, the register strokes being detectable by a photocell sensor 76 in the same manner.

Figure 4A:
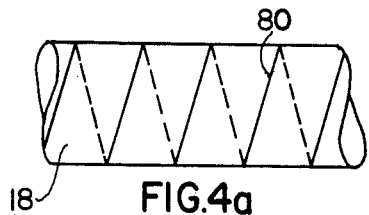
FIGS. 4a,4b show yet another embodiment, wherein a helical register line is inked onto the hose material and an optical sensor responds each time the register line crosses the sensor field, so that helical pitch, a known quantity, is being measured at every two successive crossings.
Figure 4B:
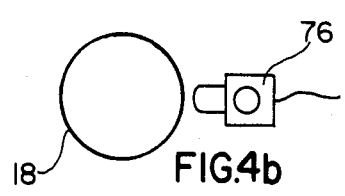

FIGS. 4a and 4b also show an embodiment of register marks detectable by a photocell 76, wherein a helical register line 80 is inked onto the hose material 18. Here again length can be determined by counting signals, since photocell 76 responds each time the register line on the hose material moves past the sensor field, so that the equally-spaced register marks being detected are the points where the register helix is intersected by an imaginary line on the hose material parallel to the main axis of the hose.

Figure 5A:
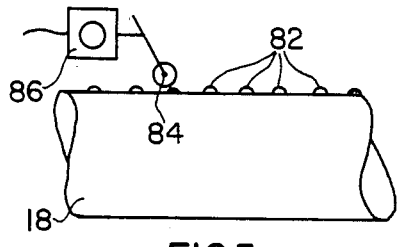
FIGS. 5a,5b are side and front views, respectively, showing register marks in the form of small elevated sites in the hose material which mechanically displace pivoted sensor rolls when these ride against the marks.
Figure 5B:
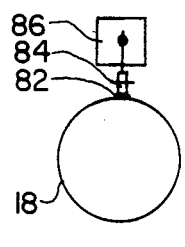

FIGS. 5a and 5b, on the other hand, show register marks in the form of small elevated sites 82 spaced at equal intervals along the length of hose material 18 and which are mechanically detected by a pivoted sensor roll 84 on a transducer 86. The transducer 86 converts mechanical displacement of the sensor roll into electrical signals in accordance with prior art, so that the signals can be counted by an electronic counting system.

Figure 6A:
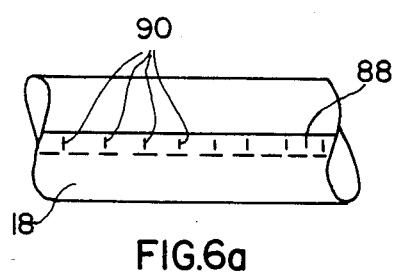
FIGS. 6a,6b are side and front views, respectively, showing hose manufactured by joining the edges of sheet material, wherein the register marks are metallic inclusions located in the bonded or welded longitudinal seam between the original edges, and are detected by a magnetic or electrical sensor.
Figure 6B:
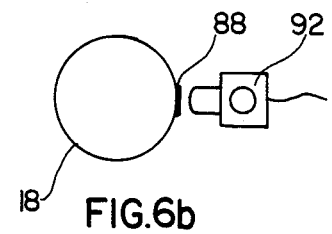

In a further embodiment, the register marks can be realized by applying onto the hose material, or embedding in it in the form of inclusions, a material containing a metallic component, so that the register marks can be detected by a magnetic or electrical sensor. FIGS. 6a and 6b illustrate such an embodiment, in which hose material 18 has been manufactured by overlapping and bonding the edges of sheet material, and metallic dots 50 have been embedded as inclusions in the edge overlap region 88 at equal intervals along the length of hose material 18', and such that the metallic dots are detected by an electrical or magnetic sensor 92 which transmits corresponding electrical signals to an electronic counting system. Of course any such metallic inclusions must be of a type and size permitted under food regulations, otherwise it must be ensured that the sausage casing formed by the hose material is removed before the sausage is consumed.

The means for turning the sausage stuffing machine 10 on and off, for positioning of revolving disk 14, for controlling the actuating cylinder of the shirring arrangement 40 and for controlling the clip-setting arrangements 22 and 58 through 64 are provided by electrically operated control systems (not shown) and interlock systems (also not shown), the purpose of the interlock systems being to allow each operating step only when the preceding one has been completed and the arrangement to be actuated is ready for operation.

The programmed operating sequence for the system shown is carried out by a microcomputer (not shown) of a familiar kind comprising a microprocessor, a programmable read-only memory (PROM) and a random-access memory (RAM), other common microprocessor components, and also counting circuits to which the two sensors 70 and 72 are connected.

There follows a description of how the system shown functions under the control of the microcomputer:

Assume that revolving disk 14 is positioned with an empty filling tube in front of the shirring arrangement 40, and that the carriage 30 is in its rightmost position in the drawing, i.e. actuating cylinder 32 is retracted, and that the slide 50 is also in its rightmost position, and that hose material from supply roll 34 has been pulled over idler rollers 36, 38, between guide pulleys 44 and over the shirring tube 42, and that the shirring tube is being held against the carriage 30 by the clamping device 56. Assume also that a shirred casing section 18, in the form of a "tubular corrugation", is sitting on the other filling tube, which is positioned in front of the ejector of sausage stuffing machine 10, and that the end of the shirred casing section that projects over the end of the filling tube has been pinched off with a clip, and assume also that the casing brake 20 has been fitted over the front end of this filling tube, and that the sensor 72 has been positioned next to filling tube $16^1$ on which the casing section is sitting.

When the shirring process begins, a counter in the microcomputer and connected to sensor 72 begins counting the "detected" signals transmitted by sensor 70, interprets each new incoming signal as an additional length (in meters) of hose material drawn off the supply roll 34 since the last signal, and repeatedly compares total length withdrawn with a programmed reference length representing the amount of hose material to be shirred onto the filling tube.

When shirring onto the rear filling tube $16^2$ begins, stuffing machine 10 is started up and proportions force-meat through the front filling tube $16^1$ into the hose material being drawn off it. Each time the preset amount of force-meat has been ejected, the stuffing sequence is interrupted, the end of the sausage just stuffed is pinched off by pinching tools, two clips 24 are fastened on at the pinch, and the stuffing machine 10 is then started back up. The length of hose material drawn off the front filling tube is continually monitored by sensor 72 and compared with the length, previously measured with the aid of sensor 70, of this hose section as it was being shirred.

Besides continually measuring the length of hose material drawn off the front filling tube, the microcomputer repeatedly determines, on the basis either of start-up of the stuffing machine 10 or activation of the clip-setting arrangement 58 through 64, the amount of hose material drawn off the front filling tube for each sausage stuffed. The microcomputer computes, from the current sum of individual-sausage hose lengths withdrawn, the amount of hose material remaining on the filling tube and then, depending on how the microcomputer is programmed, either terminates the process of stuffing, pinching off and clipping (in case there is not sufficient hose material on the filling tube to stuff another sausage), or else terminates the stuffing process sooner than usual and activates the clip-setting arrangement 58 through 64 for the final time. This technique prevents "stuffing the air" while at the same time ensuring that hose material on the front filling tube is utilized to the maximum. Each time the shirring process is completed with the preset length of home material and the clip-setting arrangement 22 has pinched off the final sausage on the string and fastened on two clips 24, the clamping device 56 is activated, clamping the hose material 18 against the shirring tube 42 and immobilizing both against the carriage. Actuating cylinder 32 now retracts, pulling the carriage 30 towards the right so as to leave enough room between the rear filling tube $16^2$ and the shirring tube 42 for the pinching jaws 62, 64 to be brought together and a clip to be set by means of clip-setting arrangement 58, 60, whereupon disk blade 66 is moved in to separate the shirred section of material from the unshirred hose still on shirring tube 42.

At the same time, casing brake 20 and sensor 72 are moved away from the front filling tube, freeing it to move when revolving disk 14 is made to rotate through 180 degrees. When the revolving disk has rotated onwards, the configuration assumed initially to obtain is regained, in which the pinching jaws 62, 64, the clip-setting arrangement 58, 60 and the disk blade 66 have all returned to their initial positions as well.

Throughout the shirring process, the amount of hose pulled off supply roll 34 is continually monitored by means of sensor 72. When the microcomputer recognizes, from the signals transmitted by the sensor, that the total amount of hose withdrawn is an integral multiple of the length of casing required to hold the contents of an individual sausage (the integral multiple representing the programmed number of sausages desired on a string), the microcomputer terminates the shirring process. Since this measurement process is carried out each time shirring is performed, variations in the length of hose needed for each sausage which can result from variable elasticity of the sausage casing material and some differences in casing cross section are continuingly monitored and incorporated as feed back information and the control of the shirring process. Such variations generally occur only as gradual changes, the hose material can in this way be stuffed with sausage to practically 100% efficiency.

I claim:

1. Hose material to be used as sausage casing, in particular in a process for the automated manufacture of string sausage on a sausage stuffing machine, such that repeatedly during said process a relatively long length of hose material is received from a supply source, shirred and separated from the hose material source, whereupon each hose section arising in this way is brought into contact with the force meat ejector of the stuffing machine and, while being pulled off a filling tube, under frictional control, is stuffed with a preset amount of force meat, then clipped off and divided off, and also such that continually during said process two links are being measured, namely the links of each shirred hose section as it is received from the supply source and the length of the same section of hose material as it is pulled off the filling tube later on during stuffing at the stuffing machine, and such that the stuffing, clipping off and dividing off steps are interrupted at appropriate times on the basis of a comparison made between the two aforementioned links, wherein the hose material contains register marks spaced at equal intervals along its links, said register marks being detectable by automatic means.

2. Hose material according to claim 1, wherein the space between register marks is no longer than the links of the shortest sausage to be manufactured with the hose material.

3. Hose material according to claim 1, wherein the register marks are ink dots or strokes detectable by optical-electronic means.

4. Hose material according to claim 2, wherein the register marks are elevated sites spaced longitudinally at equal intervals and detectable by mechanical means.

5. Hose material according to claim 1, wherein the register marks are portions of a register line 80 winding helically around the hose material.

6. Hose material according to claim 1, wherein the register marks are composed of a material containing a metallic component deposited on, or included in, the hose material, the register marks being detectable by electrical or magnetic means.

7. Hose material according to claim 6, wherein the inclusions are located between the overlapping edges of hose material that was manufactured by bonding the edges of sheet material.

8. Hose material to be used as sausage casing, in particular in a process for the automated manufacture of string sausage on a sausage stuffing machine, such that repeatedly during said process a relatively long length of hose material is received from a supply source, shirred and separated from the hose material source, whereupon each hose section arising in this way is brought into contact with the force meat ejector of the stuffing machine and, while being pulled off a filling tube, under frictional control, is stuffed with a preset amount of force meat, then clipped off and divided off, and also such that continually during said process two links are being measured, namely the links of each shirred hose section as it is received from the supply source and the length of the same section of hose material as it is pulled off the filling tube later on during stuffing at the stuffing machine, and such that the stuffing, clipping off and dividing off steps are interrupted at appropriate times on the basis of a comparison made between the two aforementioned links, wherein the hose material contains register marks spaced at equal intervls along its links, said register marks being detectable by automatic means, and wherein the space between register marks is no longer than the links of the shortest sausage to be manufactured with the hose material.

9. Hose material according to claim 8, wherein the register marks are ink dots or strokes detectable by optical-electronic means.

10. Hose material according to claim 8, wherein the register marks are elevated sites spaced longitudinally at equal intervals and detectable by mechanical means.

11. Hose material according to claim 8, wherein the register marks are portions of a register line 80 winding helically around the hose material.

12. Hose material according to claim 8, wherein the register marks are composed of a material containing a metallic component deposited on, or included in, the hose material, the register marks being detectable by electrical or magnetic means.

13. Hose material according to claim 12, wherein the inclusions are located between the overlapping edges of hose material that was manufactured by bonding the edges of sheet material.

* * * * *